(No Model.)
E. T. THOMAS.
Sewing Machine.
No. 240,932. Patented May 3, 1881.
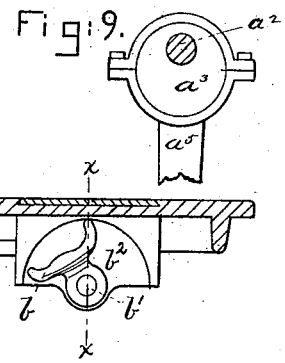
Fig. 9.
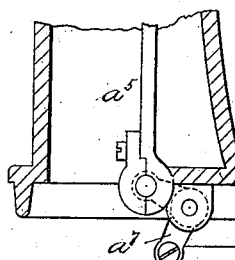
Fig. 1.
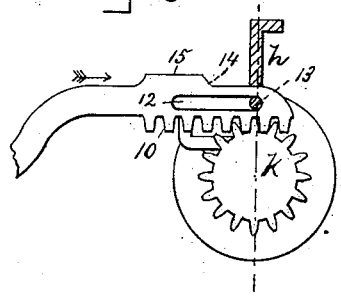
Fig. 3.
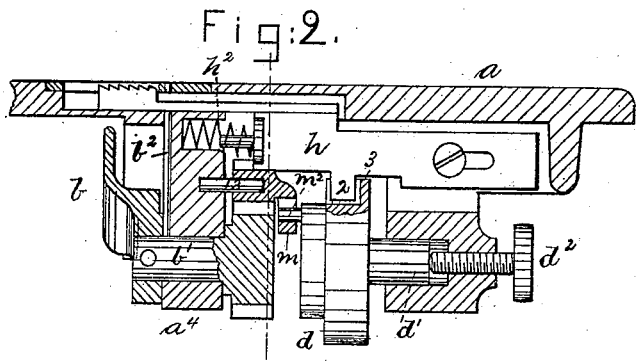
Fig. 2.
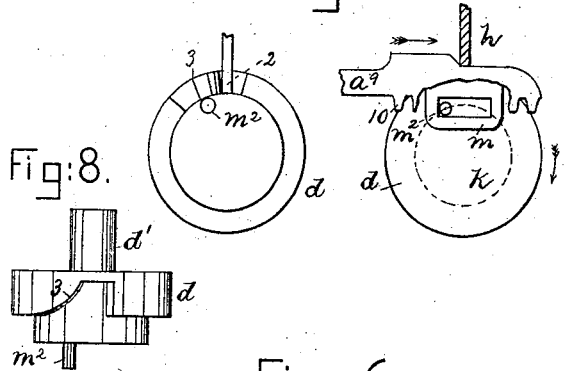
Fig. 4.  Fig. 5.
Fig. 8.
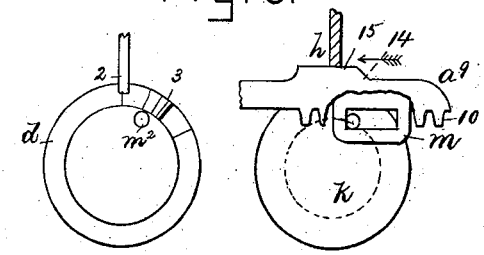
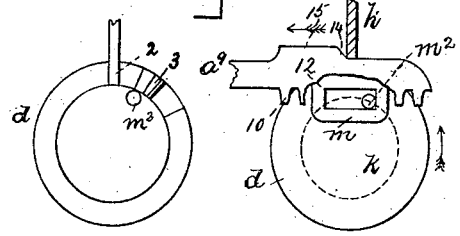
Fig. 6.
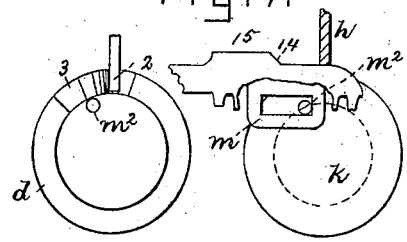
Fig. 7.
Witnesses
L. F. Connor
Arthur Reynolds
Inventor
Eddy T. Thomas
by Crosby & Gregory
Attys.

UNITED STATES PATENT OFFICE.

EDDY T. THOMAS, OF NEW YORK, N. Y., ASSIGNOR TO THE GOLD MEDAL SEWING MACHINE COMPANY, OF ORANGE, MASS.

SEWING-MACHINE.

SPECIFICATION forming part of Letters Patent No. 240,932, dated May 3, 1881.

Application filed November 19, 1880. (No model.)

*To all whom it may concern:*

Be it known that I, EDDY T. THOMAS, of New York city, New York county, and State of New York, have invented an Improvement in Sewing-Machines, of which the following description, in connection with the accompanying drawings, is a specification.

This invention in sewing-machines relates to mechanism for actuating the shuttle-carrier and feed-bar, whereby I am enabled to greatly simplify a lock-stitch sewing-machine employing a shuttle.

In this my invention the needle-bar will be moved from a cam on a rotating shaft in the overhanging arm, as now practiced in the "Home," or any other well-known sewing-machine, and the said rotating shaft will have fixed upon it an eccentric to actuate a link connected with a bell-crank lever, as in my application, No. 20,837, for United States patent, filed November 19, 1880, to which reference may be had. This bell-crank lever has joined with it a guided and toothed connecting-rod, which engages a pinion on and oscillates a rock-shaft, with which the shuttle-carrier is attached. The said connecting-rod, by means of a slotted connection, rocks a feed-operating cam about its axis and moves the feed-bar forward at the proper times, and a cam formed on the top of the connecting-rod lifts the feed-bar and permits it to descend at the proper times.

Figure 1 represents, in section and side elevation, sufficient of a sewing-machine to indicate my present invention, the upper portion of the sewing-machine (not represented) being supposed to be well known, or, as represented in my application above referred to. Fig. 2 is an enlarged section of Fig. 1 on the dotted line $x$ $x$. Fig. 3 is a detail, showing the forward end of the toothed connecting-rod for moving the shuttle and feed, the feed-bar being shown as lowered and resting thereon. Figs. 4 to 7, inclusive, represent, in detail, the feed-operating cam and toothed connecting-rod and feed-bar in different positions; and Fig. 8 the feed-operating cam in top view; and Fig. 9, a view of the upper end of link $a^5$ and the eccentric $a^3$ on the shaft $a^2$, as in my application referred to.

The frame-work $a$ of the machine is, or it may be, of any suitable and usual construction. In the overhanging arm (broken off and not shown, to save room upon the drawings) there will be placed a rotating needle-bar-operating shaft $a^2$, such as shown in my application No. 20,837, referred to, filed November 19, 1880, through which an eccentric, $a^3$, (see detail, Fig. 9,) will reciprocate the link $a^5$, joined, as described, with the bell-crank lever $a^7$, the latter having jointed to it at its other end the connecting-rod $a^9$, all as in the said application, except that the connecting-rod herein shown has its forward end provided with a series of rack-teeth, 10, which engage with a pinion, $k$, on or forming part of a rock-shaft, $b'$, mounted loosely on the bearing $a^4$, so that as the said connecting-rod is reciprocated the said rock-shaft is turned, and the shuttle-carrier and its shuttle, of usual construction, (not shown,) vibrated to enter and pass through the loop of needle-thread projected from the usual eye-pointed needle. This connecting-rod is slotted at 12 to fit over a stationary pin, 13, which acts to keep the teeth of the said rod in engagement with the teeth of the gear $k$, as in Fig. 3. The upper side of this connecting-rod is provided with a feed-bar-lifting cam, composed of an incline, 14, to lift the feed-bar $h$, and a surface, 15, to keep it raised for the proper length of time. At the rear side of this connecting-rod (see Figs. 2 and 4 to 7) is attached a slotted ear, to engage a pin, $m^2$, connected with one side of the feed-bar-operating cam $d$, which, with its incline 3, its stud $d'$, and feed-adjusting screw $d^2$ and feed-bar $h$ with leg 2, are all as in my application No. 20,837 for United States patent, filed on the 19th day of November, 1880, to which reference may be had, the incline 3 acting on the leg 2 of the said feed-bar as the cam $d$ is rocked to move the feed-bar forward after it has been lifted against the fabric by the lifting-cam on the connecting-rod, a spring, $h^2$, pushing the feed-bar backward and down at the proper time. Forward movement of the screw $d^2$ changes the position of the cam $d$ and alters the length of the feed-stroke.

A sewing-machine having its shuttle-carrier and feed actuated as herein described may be made cheaply, and will be very simple as to its mechanical parts, and will run easily and rapidly.

I am aware that it is not new to move a shuttle-carrier from a rack and pinion; but I am not aware that the same toothed connecting-rod for operating the shuttle-carrier has ever been used to also lift the feed-bar and turn its forward-moving cam.

The slot-and-pin connection between the connecting-rod $a^9$ and the cam $d$ permits the cam for lifting the feed-bar to act in advance of the forward-moving incline 3, so as to elevate the serrated part of the feed-bar against the fabric before the feed-bar is moved forward.

I claim—

In a sewing-machine, the shuttle-carrier fixed upon the shaft $b'$, placed loosely in its bearings, the pinion secured to the said shaft, the toothed connecting-rod provided with the feed-bar-lifting cam, and in engagement with the said pinion, and means to reciprocate the connecting-rod, combined with the feed-bar $h$, having leg 2, the feed-bar-moving cam $d$, having an inclined surface, 3, and means to join the connecting-rod and cam $d$, to permit lost motion between the rod and cam, substantially as described.

In testimony whereof I have signed my name to this specification in the presence of two subscribing witnesses.

EDDY T. THOMAS.

Witnesses:
SPENCER C. DOTY,
BERNARD J. KELLY.